United States Patent
Yoshida et al.

(10) Patent No.: US 9,071,182 B2
(45) Date of Patent: Jun. 30, 2015

(54) MOTOR DRIVE DEVICE WITH ALARM LEVEL SETTING UNIT

(71) Applicant: FANUC CORPORATION, Minamitsuru-gun, Yamanashi (JP)

(72) Inventors: Tomokazu Yoshida, Yamanashi (JP); Shinichi Horikoshi, Yamanshi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/020,280

(22) Filed: Sep. 6, 2013

(65) Prior Publication Data

US 2014/0070743 A1 Mar. 13, 2014

(30) Foreign Application Priority Data

Sep. 7, 2012 (JP) .................................. 2012-197219

(51) Int. Cl.
| | |
|---|---|
| H02P 3/14 | (2006.01) |
| H02P 6/24 | (2006.01) |
| H02P 29/02 | (2006.01) |
| H02H 7/10 | (2006.01) |

(52) U.S. Cl.
CPC ................ *H02P 6/24* (2013.01); *H02P 29/024* (2013.01); *H02H 7/10* (2013.01)

(58) Field of Classification Search
CPC ................ H02P 3/12; H02P 3/14; H02P 3/22
USPC ........................ 318/479, 812, 400.3, 490, 494
See application file for complete search history.

(56) References Cited

U.S. PATENT DOCUMENTS

| | | | | |
|---|---|---|---|---|
| 5,814,954 A | * | 9/1998 | Suzuki et al. .................. | 318/376 |
| 7,312,593 B1 | * | 12/2007 | Streicher et al. .............. | 318/473 |
| 7,931,128 B2 | * | 4/2011 | Sakai et al. .................... | 187/293 |
| 8,736,215 B2 | * | 5/2014 | Niwa et al. ..................... | 318/479 |
| 2007/0216340 A1 | * | 9/2007 | Iura et al. ....................... | 318/801 |
| 2011/0238338 A1 | * | 9/2011 | Iwashita et al. ................. | 702/58 |
| 2012/0068636 A1 | | 3/2012 | Iwashita et al. | |

FOREIGN PATENT DOCUMENTS

| | | |
|---|---|---|
| JP | 2193573 A | 7/1990 |
| JP | 731001 A | 1/1995 |
| JP | 7213094 A | 8/1995 |
| JP | 10228987 A | 8/1998 |
| JP | 2008271687 A | 11/2008 |

* cited by examiner

*Primary Examiner* — Rina Duda
*Assistant Examiner* — Bickey Dhakal
(74) *Attorney, Agent, or Firm* — Lowe Hauptman & Ham, LLP

(57) ABSTRACT

A motor drive device includes a converter which mutually converts power between AC power and DC power, an inverter which converts the DC power into AC power for driving a motor to output to a motor side, and converts regenerated AC power from the motor side into DC power to output to the DC side, a DC link unit which connects a DC side of the converter and a DC side of the inverter, a voltage detecting unit which detects a DC voltage value, an alarm level setting unit which sets an alarm level of the DC voltage value, an alarm determining unit which determines whether or not the DC voltage value exceeds the alarm level, and an alarm reporting unit which instructs the inverter to stop conversion operation when it is determined that the voltage value exceeds the alarm level.

2 Claims, 5 Drawing Sheets

MOTOR DRIVE DEVICE WITH ALARM LEVEL SETTING UNIT

RELATED APPLICATIONS

The present application is based on, and claims priority from, Japanese Application Number 2012-197219, filed Sep. 7, 2012, the disclosure of which is hereby incorporated by reference herein in its entirety.

BACKGROUND OF THE INVENTION

1. Field of the Invention

The present invention relates to a motor drive device which converts AC power supplied from an AC power supply side into DC power, outputs the DC power, and then converts the DC power into AC power for driving a motor.

2. Description of the Related Art

Motor drive devices which drive motors in machine tools, press and forging machines, injection molding machines, industrial machines or various robots, convert AC power input from an AC power supply side into DC power, and then converts the DC power into AC power for use as power for driving the motor provided for each drive shaft. Such a motor drive device includes a converter which rectifies AC power supplied from an AC power supply side provided with a three-phase AC input power supply to output DC power, and an inverter which is connected to a DC link unit that is a DC output side of the converter and which mutually converts power between DC power of the DC link unit and AC power which is power for driving the motor or regenerated power, and controls velocity, torque or position of a rotator of the motor connected at an AC output side of the inverter. At the DC link unit which connects a DC side of the converter and a DC side of the inverter, a DC link capacitor is provided. The DC link capacitor functions as a smoothing capacitor for suppressing pulsation of a DC output of the converter, and is capable of accumulating DC power. The number of inverters provided is the same as the number of motors so that the inverters supply driving power respectively to the motors which are provided so as to correspond to a plurality of drive shafts to drive and control the motors, while the number of converters provided is usually one with respect to a plurality of inverters so as to reduce cost of the motor drive device and space.

In recent years, because there is a demand for energy conservation, power regenerative rectifiers which are capable of returning regenerated power generated upon deceleration of motors to an AC power supply side are commonly used as converters in motor drive devices. Such a rectifier converts AC power supplied from an AC power supply side into DC power to output to a DC side, and then converts the DC power supplied from the DC side into AC power upon deceleration of a motor to output to the AC power supply side. Regenerated power generated at the motor upon deceleration of the motor is converted from AC power into DC power by an inverter, input to a converter via a DC link unit, further converted into AC power by the converter, and returned to the AC power supply side. At this time, voltage of a DC link capacitor of the DC link unit fluctuates according to the amount of the regenerated power generated at the motor and the amount of the AC power returned to the AC power supply side via the inverter, the DC link unit and the converter.

In a motor drive device which converts AC power supplied from an AC power supply side into DC power, outputs the DC power, and then converts the DC power into AC power for driving a motor to supply to the motor, a relationship among the amount of regenerated power generated at the motor, the amount of the AC power returned to the AC power supply side and a voltage of the DC link capacitor will be described below with reference to FIG. 5 to FIG. 8. FIG. 5 is a circuit diagram illustrating a flow of energy when the amount of the regenerated power generated at the motor is smaller than the amount of the AC power returned to the AC power supply side in the motor drive device, and FIG. 6 illustrates an increase of the voltage of the DC link capacitor in the case of FIG. 5. Further, FIG. 7 is a circuit diagram illustrating a flow of energy when the amount of the regenerated power generated at the motor is greater than the amount of the AC power returned to the AC power supply side in the motor drive device, and FIG. 8 illustrates an increase of the voltage of the DC link capacitor in the case of FIG. 7. A case will be described where, as illustrated in FIG. 5 and FIG. 7, the motor drive device 100 includes a converter 11 which rectifies AC power supplied from the AC power supply side provided with a three-phase AC input power supply 3 to output DC power, and a inverter 21 which is connected to the DC link unit 12 which is a DC output side of the converter 11 and which mutually converts power between DC power of the DC link unit 12 and AC power which is power for driving the motor 2 or regenerated power, and when the motor 2 which operates at constant speed by the motor drive device 100, is decelerated at time $t_1$, regenerated power $P_1$ is generated at the motor 2.

Diodes are connected in inverse parallel to the switching elements within the converter 11 so that the converter 11 can return the regenerated power generated upon deceleration of the motor to the AC power supply side. Because there is an upper limit in capability of the converter 11 to convert DC power into AC power, when the amount of regenerated power generated at the motor 2 exceeds the amount of power which can be converted from DC power into AC power by the converter 11, a voltage of the DC link capacitor C within the DC link unit 12 increases. The amount of AC power which can be returned to the AC power supply side is limited by the capability of the converter 11 to convert DC power into AC power. For example, as illustrated in FIG. 5, when the motor 2 which operates at constant speed, is decelerated at time $t_1$, regenerated power $P_1$ is generated at the motor 2. When the amount of this regenerated power $P_1$ is within a range of the capability of the converter 11 to convert DC power into AC power, the voltage of the DC link capacitor C starts increasing at time $t_1$ at which deceleration of the motor 2 starts by accumulation of the regenerated power $P_1$ generated at the motor 2 in the DC link capacitor C as illustrated in FIG. 6, and the voltage of the DC link capacitor C becomes a constant value (at time $t_2$) when the amount of power converted from DC power into AC power by the converter 11 (expressed by $P_2$ in the drawing) is balanced with the amount of the regenerated power $P_1$ generated at the motor 2. As illustrated in FIG. 7, when the regenerated power $P_1$ generated when the motor 2 is decelerated at time $t_1$ exceeds the capability of the converter 11 to convert DC power into AC power, the voltage of the DC link capacitor C starts increasing at time $t_1$ at which the motor 2 starts deceleration by accumulation of the regenerated power $P_1$ generated at the motor 2 in the DC link capacitor C as illustrated in FIG. 8, and because the amount of the regenerated power $P_1$ generated at the motor 2 is larger than that can be converted by the conversion capability of the converter 11, the DC power continues to be accumulated in the DC link capacitor C, which results in continuing increase of the voltage of the DC link capacitor C.

The voltage of the DC link capacitor C, if exceeding a voltage of elements of the converter 11 and the inverter 21 or the DC link capacitor C itself, may lead to breakage of the elements. Therefore, generally, in the motor drive device, an "overvoltage alarm level" is set in advance for the voltage of the DC link capacitor C in the DC link unit 12 as a maximum voltage which is an allowable voltage in view of the withstand voltage of the elements of the converter 11 and the inverter 21 and the DC link capacitor C itself. The voltage of the DC link capacitor C in the DC link unit 12 is always monitored, and when the voltage exceeds the overvoltage alarm level, some kind of crisis prevention processing is executed.

For example, there exists a motor drive device in which, when the voltage of the DC link capacitor C in the DC link unit 12 exceeds the overvoltage alarm level, an overvoltage alarm signal is output to the inverter 21, and in response to this signal, the inverter 21 turns off switching operation for power conversion operation so as to stop conversion of the regenerated power generated at the motor 2 into the DC power (hereinafter, referred to as "stop conversion by alarm"). In this case, it is possible to block inflow of the regenerated power into the DC link unit 12, which suppresses increase of the voltage of the DC link capacitor.

Other than the above-described motor drive device which stops conversion by alarm, as a device that suppresses increase of the voltage of the DC link capacitor, there is for example, a motor drive device as disclosed in Japanese Unexamined Patent Publication No. 2008-271687 which additionally connects an auxiliary DC link capacitor to a DC link unit when a voltage of a DC link capacitor exceeds an overvoltage alarm level due to regenerated power generated at a motor. In this case, the regenerated power flowing into the DC link unit 12 is accumulated in the DC link capacitor with greater capacitance, so that it is possible to suppress increase of the voltage of the DC link capacitor.

In the above-described motor drive device which stops conversion by alarm, there is a time lag between time at which an overvoltage of the voltage of the DC link capacitor in the DC link unit is detected and time at which conversion operation of the inverter is actually stopped, due to generation and transmission time of the overvoltage alarm signal and time required for stop processing of the inverter. Depending on time from when the overvoltage of the voltage of the DC link capacitor is detected till when the conversion operation of the inverter is actually stopped, there is a possibility that although the overvoltage of the voltage of the DC link capacitor is detected, the voltage of the DC link capacitor will further increase and exceed the withstand voltage of the DC link capacitor, switching elements configuring the converter and the inverter, and elements such as diodes. Further, depending on the level of the regenerated power generated at the motor, the voltage of the DC link capacitor will further increase from when the overvoltage of the voltage of the DC link capacitors detected till when conversion operation of the inverter is actually stopped, and there is a possibility that the voltage of the DC link capacitor will exceed the withstand voltage of the DC link capacitor and the elements configuring the converter and the inverter.

Further, in either case of the above-described motor drive device which stops conversion by alarm and the motor drive device disclosed in Japanese Unexamined Patent Publication No. 2008-271687, the overvoltage alarm level is set lower than the withstand voltage to some extent while maintaining margin for security purpose taking into account the withstand voltage of the elements of the converter and the inverter and the DC link capacitor. Therefore, in some cases, such margin sometimes becomes an excessive margin.

SUMMARY OF THE INVENTION

In light of the problems described above, it is an object of the present invention to provide a motor drive device which can efficiently and reliably protect, from an overvoltage of a DC link unit, the elements configuring the motor drive device which converts AC power supplied from an AC power supply side into DC power, outputs the DC power, and further converts the DC power into AC power for driving a motor to supply to the motor.

In order to realize the above object, the motor drive device includes a converter which converts AC power supplied from an AC power supply side into DC power to output to a DC side, and converts the DC power supplied from the DC side into AC power at the time of deceleration of the motor to output to the AC power supply side, an inverter which converts the DC power supplied from a DC side into AC power for driving the motor to output to an AC motor side, and converts regenerated AC power from the AC motor side into DC power to output to the DC side at the time of deceleration of the motor, a DC link unit which connects the DC side of the converter and the DC side of the inverter, and which includes a DC link capacitor which is capable of accumulating DC power, a voltage detecting unit which detects a DC voltage value of the DC link capacitor, an alarm level setting unit which sets an overvoltage alarm level for the DC voltage value of the DC link capacitor, an alarm determining unit which determines whether or not the DC voltage value detected by the voltage detecting unit exceeds the overvoltage alarm level set by the alarm level setting unit, and an alarm reporting unit which, when the alarm determining unit determines that the DC voltage value detected by the voltage detecting unit exceeds the overvoltage alarm level set by the alarm level setting unit, instructs the inverter to stop conversion operation.

The alarm level setting unit may include a forecasting calculating unit which performs forecasting calculation of an increase of the DC voltage value of the DC link capacitor during time required for the inverter to stop the conversion operation after the alarm determining unit determines that the DC voltage value exceeds the overvoltage alarm level, based on a first parameter which is time required for the inverter to stop the conversion operation after the alarm determining unit determines that the DC voltage value exceeds the overvoltage alarm level, a second parameter which is an amount of the DC power generated by converting by the inverter regenerated AC power generated at the time of deceleration of the motor, a third parameter which is the amount of the DC power used to generate the AC power to be returned to the AC power supply side by the converter at the time of deceleration of the motor, and a fourth parameter which is capacitance of the DC link capacitor, and a settling unit which sets the overvoltage alarm level based on the increase when the DC voltage value of the DC link capacitor at a time when the inverter stops conversion operation, which is calculated from the increase, is greater than a predetermined threshold set based on a withstand voltage of the DC link capacitor and a withstand voltage of each element in the converter and the inverter, and sets the predetermined threshold as the overvoltage alarm level when the DC voltage value of the DC link capacitor at the time when the inverter stops the conversion operation is smaller than the predetermined threshold.

The settling unit preferably sets a value obtained by subtracting the increase from a value which is twice the predetermined threshold as the overvoltage alarm level when the DC voltage value of the DC link capacitor at a time when the inverter stops the conversion operation, which is calculated from the increase, is greater than the predetermined threshold.

Further, settings of the first parameter, the second parameter, the third parameter and the fourth parameter can be changed by an external instruction.

BRIEF DESCRIPTION OF THE DRAWINGS

The present invention will be more clearly understood by referring to the following attached drawings.

DETAILED DESCRIPTION

Figure 1:
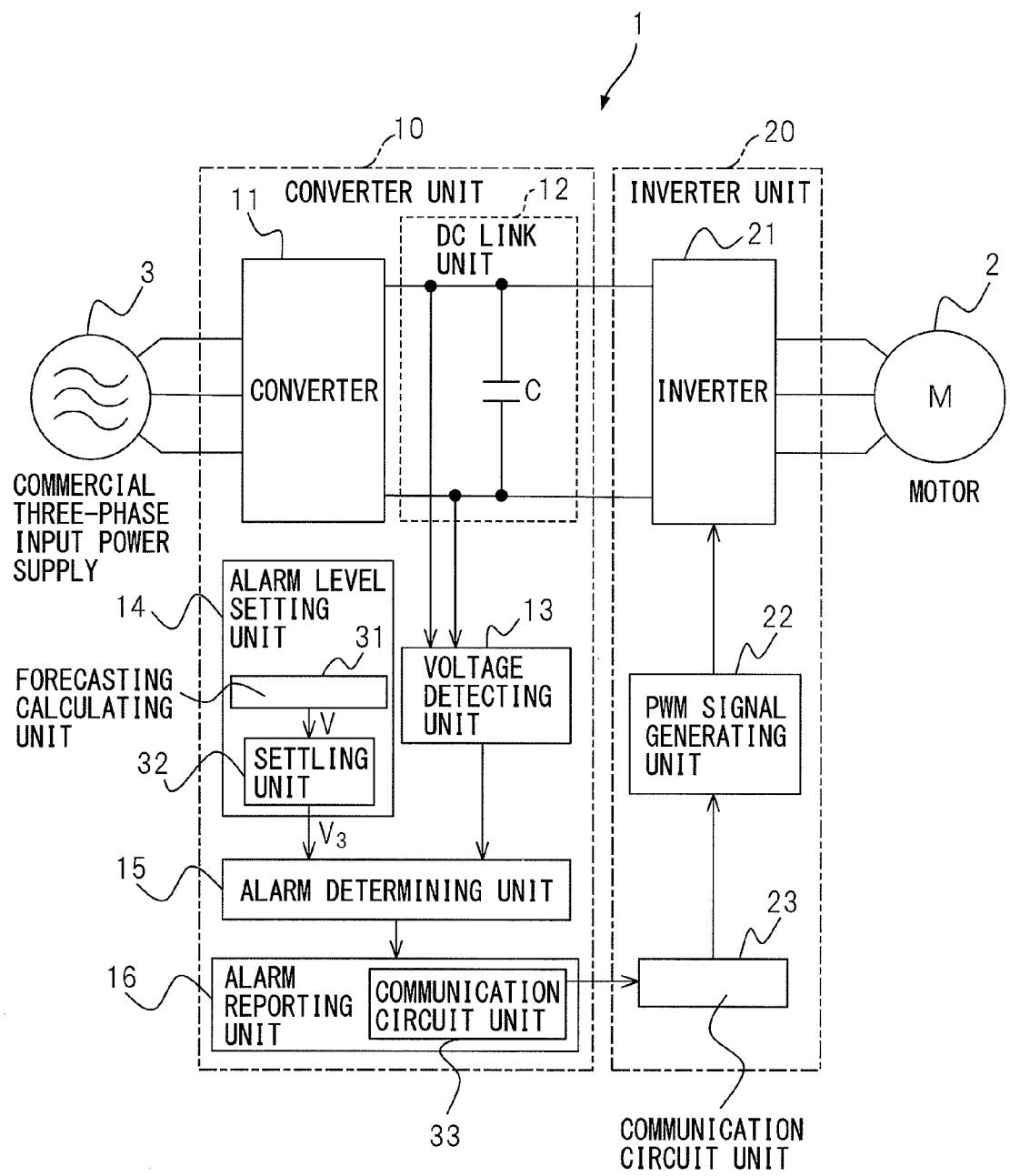
FIG. 1 illustrates a configuration of a motor drive device according to an embodiment.

A motor drive device having an alarm level setting unit will be described below with reference to the drawings. It should be understood that the present invention is not limited to the embodiments illustrated in the drawings or described below.

FIG. 1 illustrates a configuration of the motor drive device according to the embodiment. Hereinafter, components to which the same reference numerals are assigned in different drawings are intended to indicate components having the same functions.

While a motor drive device which drives and controls one motor will be described in the embodiment described below, the present invention is not limited by the number of motors to be driven and controlled, and can be applied to a motor drive device which drives and controls a plurality of motors. Further, while both an AC commercial power supply and an AC motor connected to the motor drive device are configured in three phases, the number of phases does not limit the present invention and may be, for example, a single phase. Further, the type of the motor to be driven by the motor drive device does not limit the present invention, and may be, for example, an induction motor or a synchronous motor.

As illustrated in FIG. 1, the motor drive device 1 is configured with a converter unit 10 and an inverter unit 20. A commercial three-phase input power supply 3 is connected at an AC power supply side of the converter unit 10, and a three-phase motor 2 is connected to an AC motor side of the inverter unit 20.

The converter unit 10 in the motor drive device 1 includes a converter 11, a DC link unit 12, a voltage detecting unit 13, an alarm level setting unit 14, an alarm determining unit 15 and an alarm reporting unit 16.

The converter 11 is an electric power converter which can convert power between AC power and DC power, and which converts AC power supplied from the AC power supply side into DC power to output to a DC side, and converts the DC power supplied from the DC side into AC power upon deceleration of the motor to output to the AC power supply side. Embodiments of the converter 11 are not particularly limited as long as the converter 11 is an electric power converter which can convert power between AC power and DC power, and includes, for example, a rectifier circuit which performs 120-degree energization, or a rectifier circuit which employs a PWM control method. The converter 11 is configured as a conversion circuit having switching elements inside. As the switching elements, for example, an IGBT is employed, and diodes are connected in inverse parallel to this IGBT.

The DC link unit 12, which connects the DC side of the converter 11 and the DC side of the inverter 21 and transmits and receives DC power, includes a DC link capacitor C. The DC link capacitor C has a function as a smoothing capacitor for suppressing pulsation of a DC output of the converter 11 or the inverter 21, and is capable of accumulating DC power.

The voltage detecting unit 13 detects a DC voltage value of the DC link capacitor C and transmits the DC voltage value to the alarm determining unit 15.

The alarm level setting unit 14 sets an overvoltage alarm level for the DC voltage value of the DC link capacitor C according to predetermined conditions. The details of the operation of the alarm level setting unit 14 will be described later.

The alarm determining unit 15 determines whether or not the DC voltage value detected by the voltage detecting unit 13 exceeds the overvoltage alarm level set by the alarm level setting unit 14.

When the alarm determining unit 15 determines that the DC voltage value detected by the voltage detecting unit 13 exceeds the overvoltage alarm level set by the alarm level setting unit 14, the alarm reporting unit 16 reports to a communication circuit unit 23 within the inverter unit 20 an instruction to stop conversion operation of the inverter 21 within the inverter unit 20. The alarm reporting unit 16, which includes a communication circuit unit 33, transmits a signal for instructing the inverter 21 within the inverter unit 20 to stop the conversion operation, to the communication circuit unit 23 of the inverter unit 20 through the communication circuit unit 33.

The inverter unit 20 within the motor drive device 1 includes the inverter 21, a PWM signal generating unit 22, and the communication circuit unit 23.

The inverter 21 converts the DC power supplied from the DC side into AC power for driving the motor 2 to output to an AC motor side, and converts regenerated AC power from the AC motor side generated upon deceleration of the motor into DC power to output to the DC side. The converter 11 and the inverter 21 are connected through the DC link unit 12. Because an example where the motor drive device 1 drives and controls one motor 2 is described here, one inverter 21 is provided for the motor 2.

The inverter 21 is configured as a conversion circuit such as a PWM inverter, which includes switching elements inside. The inverter 21 converts the DC power supplied from the DC link unit 12 side into three-phase AC power having a desired voltage and desired frequency for driving the motor 2 by making the internal switching elements perform switching operation based on a PWM signal received from the PWM signal generating unit 22. The motor 2 operates based on the supplied three-phase AC power having variable voltage and variable frequency. Further, regenerated power is generated upon deceleration of the motor 2, in which case, AC power which is the regenerated power generated at the motor 2 is also converted into DC power and returned to the DC link unit 12 based on the PWM signal received from the PWM signal generating unit 22. In this way, the inverter 21 mutually converts power between DC power of the DC link unit 12 and AC power which is power for driving the motor 2 or regenerated power, based on the received PWM signal.

The PWM signal generating unit 22 generates the PWM signal as a motor driving instruction. In other words, the PWM signal generating unit 22 creates a motor driving instruction so that the motor 2 operates at desired speed (acceleration, deceleration, constant speed, stop, or the like), at desired torque and a desired position of a rotator, and outputs the PWM signal to a gate of the IGBT within the inverter 21 so that the inverter 21 outputs an AC current having a waveform and frequency required for the motor 2 to operate based on the motor driving instruction. The switching operation of the inverter 21 is controlled by the PWM signal generated by the PWM signal generating unit 22.

The communication circuit unit 23 communicates with the communication circuit unit 33 of the alarm reporting unit 16 within the converter unit 10. When receiving a signal for instructing the inverter 21 to stop the conversion operation from the communication circuit unit 33, the communication circuit unit 23 instructs the PWM signal generating unit 22 to generate the PWM signal for stopping the switching operation of the switching elements within the inverter 21.

Figure 2:
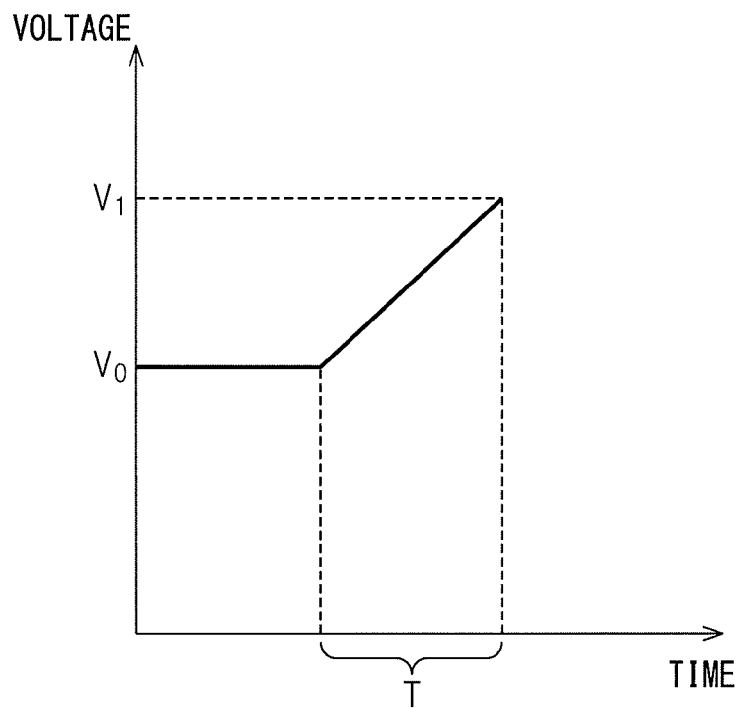
FIG. 2 illustrates regenerated power which is generated upon deceleration of a motor in the motor drive device according to the embodiment.
Figure 3:
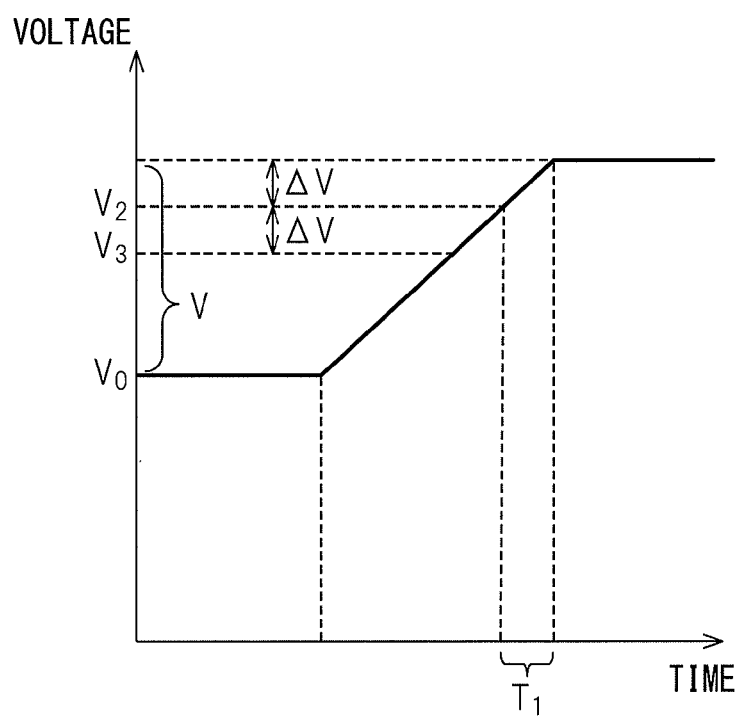
FIG. 3 illustrates an overvoltage alarm level set in the motor drive device according to the embodiment.

Next, an operating principle of the alarm level setting unit 14 will be described. FIG. 2 illustrates regenerated power of the motor generated upon deceleration of the motor in the motor drive device according to the embodiment. Further, FIG. 3 illustrates settings of the overvoltage alarm level set in the motor drive device according to the embodiment.

First, it is assumed that from when the motor 2 starts deceleration till when a voltage of the DC link capacitor C reaches $V_1$ by the regenerated power generated at the motor 2, the inverter 11 does not regenerate power to the AC power supply side. At this time, when capacitance of the DC link capacitor C is C, an input voltage wave peak value (voltage of the DC link capacitor in a stationary state) is $V_0$, and time required for the voltage of the DC link capacitor C to reach $V_1$ from $V_0$ is T, the amount of DC power $P_1$ generated by converting the regenerated AC power generated at the motor 2 upon deceleration of the motor by the inverter 21 satisfies the following relational equation (1):

$$P_1 \times T = \tfrac{1}{2} \times C \times (V_1^2 - V_0^2) \tag{1}$$

A voltage increase V of the DC link capacitor C due to the regenerated AC power generated at the motor 2 upon deceleration of the motor can be calculated as follows using $P_1$ calculated based on equation (1). In other words, when "the amount of DC power used to generate AC power for regenerating power to the AC power supply side by the converter 11 upon deceleration of the motor", which is performance of the converter 11 to convert DC power into AC power, is $P_2$, a withstand voltage of the elements of the converter 11 and the inverter 21 or the DC link capacitor C itself is $V_2$, and time required for the inverter 20 to stop conversion operation after the alarm determining unit 15 determines that the overvoltage alarm level is exceeded is $T_1$, a voltage increase V of the DC link capacitor C due to regenerated AC power upon deceleration of the motor, which is predicted from when the alarm determining unit 15 determines that the overvoltage alarm level is exceeded till time $T_1$ when the inverter 20 stops conversion operation, satisfies following relational equation (2):

$$(P_1 - P_2) \times T_1 = \tfrac{1}{2} \times C \times (V^2 - V_0^2) \tag{2}$$

Typically, there is a time lag $T_1$ from when the alarm determining unit 15 determines that the overvoltage alarm level is exceeded till when the inverter 20 stops conversion operation, which includes processing time of each of the alarm determining unit 15, the alarm reporting unit 16 (including the communication circuit unit 33), the communication circuit unit 23 and the PWM signal generating unit 22, time for transmitting a signal from the communication circuit unit 33 to the communication circuit unit 23, and time required for the inverter 21 to actually stop conversion operation after the PWM signal generating unit 22 instructs the inverter 21 to stop conversion operation. During this time $T_1$ from when the alarm determining unit 15 determines that the overvoltage alarm level is exceeded till when the inverter 20 stops conversion operation, the DC power flows into the DC link capacitor C from the inverter 21, which increases the voltage of the DC link capacitor C. Therefore, the overvoltage alarm level is set as described below taking into account the time $T_1$ from when the alarm determining unit 15 determines that the overvoltage alarm level is exceeded till when the inverter 20 stops conversion operation, and the withstand voltage $V_2$ of the elements of the converter 11 and the inverter 21 and the DC link capacitor C.

As illustrated in FIG. 3, a sum $(V_0+V)$ of the voltage increase V of the DC link capacitor C which is due to the regenerated AC power generated at the motor 2 upon deceleration of the motor, and which is calculated using equation (2) and the input voltage wave peak value (voltage of the DC link capacitor C in a stationary state) $V_0$, can be regarded as a DC voltage value of the DC link capacitor C at the time when the inverter 21 stops conversion operation upon deceleration of the motor. When it is determined that this value $(V_0+V)$ exceeds the withstand voltage $V_2$ of the elements of the converter 11 and the inverter 21 and the DC link capacitor, the value exceeds the withstand voltage $V_2$ of the elements of the converter 11 and the inverter 21 and the DC link capacitor C by $\Delta V(=V_0+V-V_2)$, which results in breaking down of the elements.

Accordingly, when it is determined that the sum $(V_0+V)$ of the voltage increase V of the DC link capacitor C which is due to the regenerated AC power generated at the motor 2 upon deceleration of the motor and which is calculated using equation (2) and the input voltage wave peak value (voltage of the DC link capacitor C in a stationary state) $V_0$ exceeds the withstand voltage $V_2$ of the elements of the converter 11 and the inverter 21 and the DC link capacitor C, a value $V_3(=V_2-\Delta V)$ which is lower than the withstand voltage $V_2$ of the elements of the converter 11 and the inverter 21 and the DC link capacitor C by $\Delta V$ is set as the overvoltage alarm level, as expressed in equation (3).

$$V_3 = V_2 - \Delta V \tag{3}$$

When it is determined that the sum $(V_0+V)$ of the voltage increase V of the DC link capacitor which is due to the regenerated AC power generated at the motor 2 upon deceleration of the motor and which is calculated using equation (2) and the input voltage wave peak value (voltage of the DC link capacitor C in a stationary state) $V_0$ does not exceed the withstand voltage $V_2$ of the elements of the converter 11 and the inverter 21 and the DC link capacitor C itself, the withstand voltage $V_2$ of the elements of the converter 11 and the inverter 21 and the DC link capacitor C itself is set as the overvoltage alarm level $V_3$.

The alarm level setting unit 14 in the converter unit 10 illustrated in FIG. 1 executes the above-described processing.

In other words, the alarm level setting unit 14 includes a forecasting calculating unit 31 and a setting unit 32.

The forecasting calculating unit 31 performs forecasting calculation of an increase V of the DC voltage value of the DC link capacitor C for time $T_1$ required for the inverter 21 to stop conversion operation after the alarm determining unit 15 determines that the overvoltage alarm level is exceeded based on a first parameter $T_1$ which is time required for the inverter 21 to stop conversion operation after the alarm determining unit 15 determines that the overvoltage alarm level is exceeded, a second parameter $P_1$ which is the amount of the DC power converted by the inverter 21 from the regenerated AC power generated upon deceleration of the motor, a third parameter $P_2$ which is the amount of the DC power used to generate AC power to be returned to the AC power supply side by the converter 11 upon deceleration of the motor (i.e., capability of the converter 11 to convert DC power into AC power), and a fourth parameter C which is capacitance of the DC link capacitor C, according to equation (1) and equation (2).

When the DC voltage value $(V_0+V)$ of the DC link capacitor C at a time when the inverter 21 stops conversion operation, which is calculated from the increase V of the DC voltage value of the DC link capacitor C obtained by forecasting calculation of the forecasting calculating unit 31, is greater than the predetermined threshold $V_2$ set based on the withstand voltage of the DC link capacitor C and the withstand voltage of the switching elements in the converter 11 and the inverter 21 and elements such as diodes, the setting unit 32 sets a value $(V_2-\Delta V)$ as the overvoltage alarm level $V_3$ according to equation (3), and when the DC voltage value $(V_0+V)$ of the DC link capacitor C is smaller than the predetermined threshold $V_2$, the setting unit 32 sets the predetermined threshold $V_2$ as the overvolt alarm level $V_3$.

The alarm determining unit 15 determines whether or not the DC voltage value detected by the voltage detecting unit 13 exceeds the overvoltage alarm level $V_3$ set by the alarm level setting unit 14 as described above.

According to the present invention, forecasting calculation of the increase V of the DC voltage value of the DC link capacitor C is performed based on the first parameter $T_1$ which is time required for the inverter 21 to stop conversion operation after the alarm determining unit 14 determines that the overvoltage alarm level is exceeded, the second parameter $P_1$ which is the amount of the DC power converted by the inverter 21 from the regenerated power generated upon deceleration of the motor, the third parameter $P_2$ which is the amount of the DC power used to generate AC power to be returned to the AC power supply side by the converter 11 upon deceleration of the motor (i.e., capability of the converter 11 to convert DC power into AC power), and the fourth parameter C which is capacitance of the DC link capacitor C, the DC voltage value $(V_0+V)$ of the DC link capacitor C at a time when the inverter 21 stops conversion operation based on the increase V is calculated, and the overvoltage alarm level $V_3$ is set according to magnitude relationship between the $(V_0+V)$ and the predetermined threshold $V_2$ set based on the withstand voltage of the DC link capacitor C and the withstand voltage of the switching elements in the converter 11 and the inverter 21 and elements such as diodes, so that it is possible to prevent the overvoltage alarm level $V_3$ from becoming an excessive margin with respect to each element as in the prior art and to efficiently and reliably protect the elements of the motor drive device from an overvoltage of the DC link unit.

The alarm level setting unit 14 and the alarm determining unit 15 are configured with, for example, processors which are capable of performing calculation processing and determination. Further, the above-described first parameter $T_1$, second parameter $P_1$, third parameter $P_2$ and fourth parameter C may be set to the alarm level setting unit 14 by being input or calculated in advance taking into account characteristics of the elements of the motor drive device 1 and conditions to which the motor drive device 1 is applied. Accordingly, it is possible to set an optimum overvoltage alarm level without the need to add parts.

Figure 4:
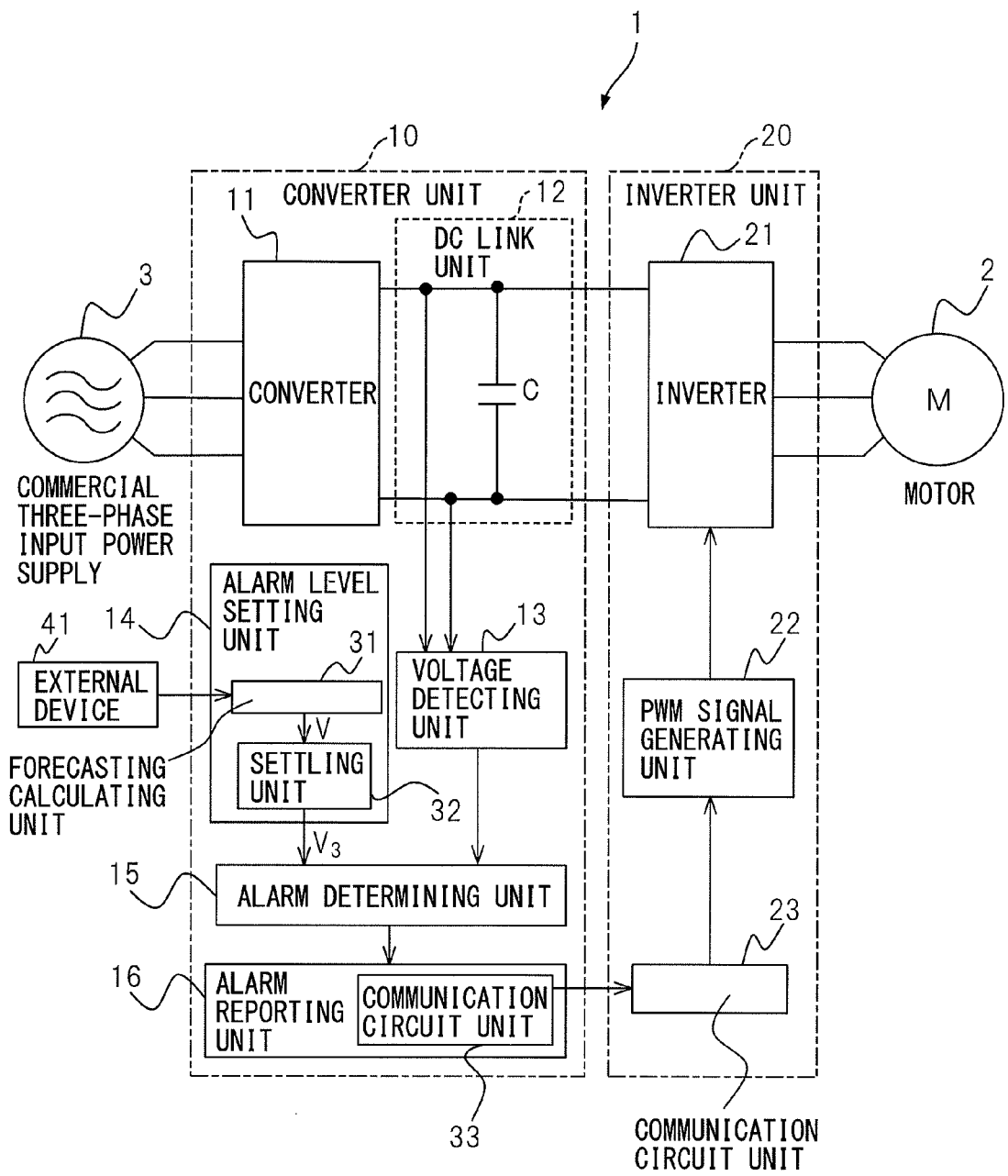
FIG. 4 illustrates a modified example of the motor drive device.
Figure 5:
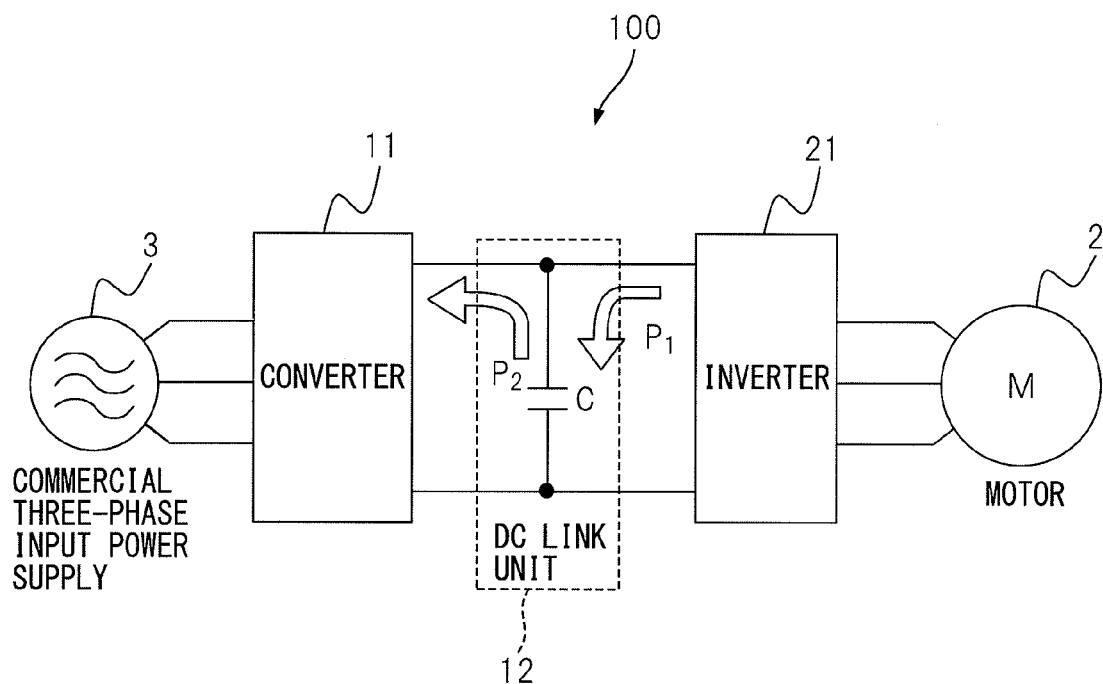
FIG. 5 is a circuit diagram illustrating a flow of energy when the amount of the regenerated power generated at the motor is smaller than the amount of AC power returned to an AC power supply side in the motor drive device.
Figure 6:
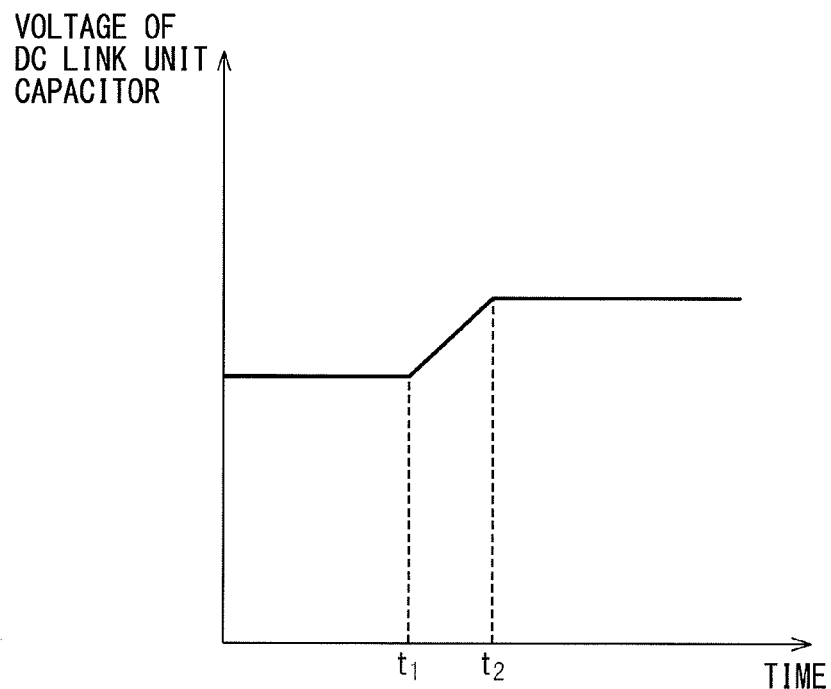
FIG. 6 illustrates an increase of a voltage of a DC link capacitor in a case illustrated in FIG. 5.
Figure 7:
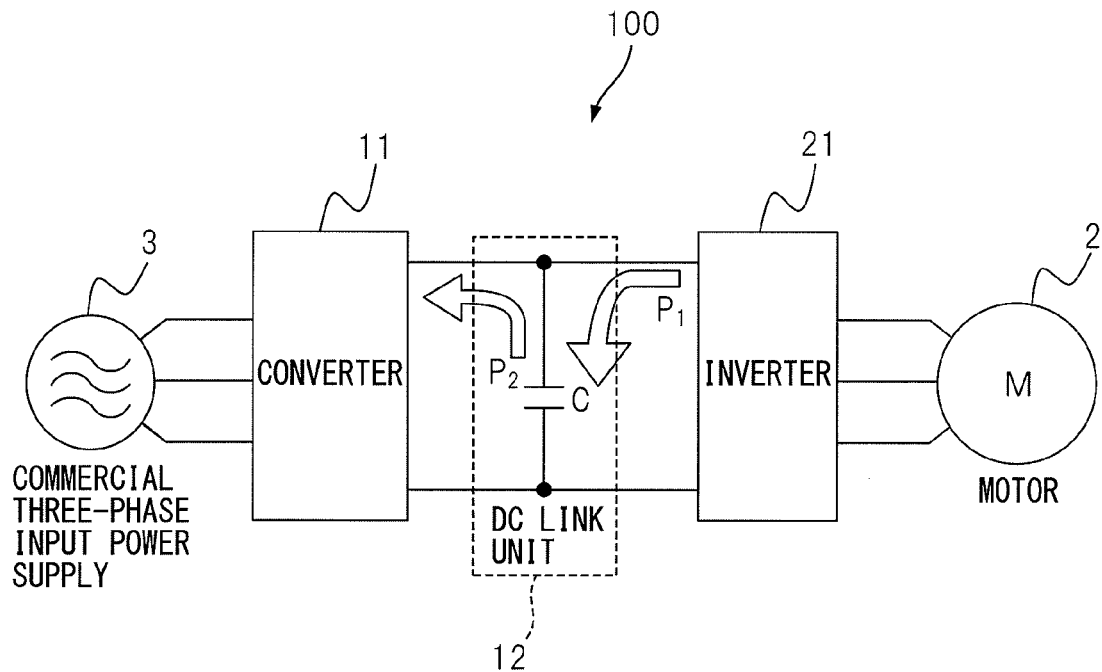
FIG. 7 is a circuit diagram illustrating a flow of energy when the amount of the regenerated power generated at the motor is greater than the amount of the AC power returned to the AC power supply side in the motor drive device.
Figure 8:
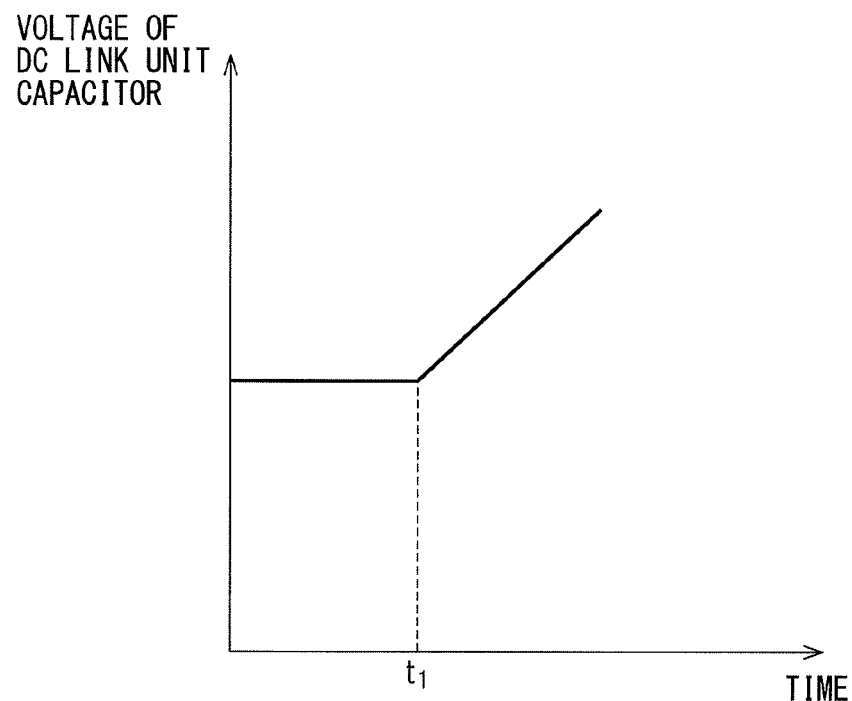
FIG. 8 illustrates an increase of the voltage of the DC link capacitor in a case illustrated in FIG. 7.

It is also possible to set the first parameter $T_1$, the second parameter $P_1$, the third parameter $P_2$ and the fourth parameter C so as to be changed by an external instruction. FIG. 4 illustrates a modified example of the motor drive device. In this modified example, an external device 41 is connected to the alarm level setting unit 14, and the settings of the first parameter $T_1$, the second parameter $P_1$, the third parameter $P_2$ and the fourth parameter C can be changed by an instruction from the external device 41. Examples of the external device 41 include a numerical control device which is a host device of the motor drive device 1, a computer having an input/output device, and various switches such as DIP switches and button switches. By setting the settings of the first parameter $T_1$, the second parameter $P_1$, the third parameter $P_2$ and the fourth parameter C so as to be changed by the external instruction in this way, it is possible to easily adjust processing related to overvoltage determination of the motor drive device 1, for example, even when the motor 2 to be driven and controlled by the motor drive device 1 is changed or the maintenance is required due to secular change.

The present invention can be applied to motor drive devices which drive motors in machine tools, press and forging machines, injection molding machines, industrial machines or various robots, which have a converter that converts input AC into DC and an inverter which converts DC output from the converter into AC to be supplied as driving power of each motor, and which protects elements configuring the motor drive device from an overvoltage of the DC link unit which connects the converter and the inverter.

According to the present invention, in the motor drive device which converts AC power supplied from the AC power supply side into DC power, outputs the DC power, and further converts the DC power into AC power for driving a motor to supply to the motor, the overvoltage alarm level is set taking into account time required for the inverter to stop conversion operation after the overvoltage alarm level is exceeded, the amount of the DC voltage converted by the inverter from the regenerated AC power generated upon deceleration of the motor, the amount of the DC power used to generate AC power to be returned to the AC power supply side by the converter upon deceleration of the motor (i.e., capability of the converter to convert DC power into AC power), and the capacitance of the DC link capacitor, so that it is possible to prevent the overvoltage alarm level in the DC link unit from becoming an excessive margin with respect to the withstand voltage of the elements as in the prior art, and to efficiently and reliably protect the elements configuring the motor drive device from an overvoltage of the DC link unit.

What is claimed is:

1. A motor drive device, comprising:
   a converter which converts AC power supplied from an AC power supply side into DC power to output to a DC side, and converts the DC power supplied from the DC side into AC power at the time of deceleration of a motor to output to the AC power supply side;
   an inverter which converts the DC power supplied from a DC side into AC power for driving the motor to output to an AC motor side, and converts regenerated AC power from the AC motor side into DC power to output to the DC side at the time of deceleration of the motor;

a DC link unit which connects the DC side of the converter and the DC side of the inverter, and which has a DC link capacitor which is capable of accumulating DC power;

a voltage detecting unit which detects a DC voltage value of the DC link capacitor;

an alarm level setting unit which sets an overvoltage alarm level for the DC voltage value of the DC link capacitor;

an alarm determining unit which determines whether or not the DC voltage value detected by the voltage detecting unit exceeds the overvoltage alarm level set by the alarm level setting unit; and an alarm reporting unit which, when the alarm determining unit determines that the DC voltage value detected by the voltage detecting unit exceeds the overvoltage alarm level set by the alarm level setting unit, instructs the inverter to stop conversion operation, wherein the alarm level setting unit comprises:

a forecasting calculating unit which performs forecasting calculation of an increase of the DC voltage value of the DC link capacitor during time required for the inverter to stop the conversion operation after the alarm determining unit determines that the DC voltage value exceeds the overvoltage alarm level, based on a first parameter which is time required for the inverter to stop the conversion operation after the alarm determining unit determines that the DC voltage value exceeds the overvoltage alarm level, a second parameter which is an amount of the DC power generated by converting by the inverter regenerated AC power generated at the time of deceleration of the motor, a third parameter which is an amount of the DC power used to generate the AC power to be returned to the AC power supply side by the converter at the time of deceleration of the motor, and a fourth parameter which is capacitance of the DC link capacitor; and a setting unit which sets the overvoltage alarm level based on the increase when the DC voltage value of the DC link capacitor at a time when the inverter stops the conversion operation, which is calculated from the increase, is greater than a predetermined threshold set based on a withstand voltage of the DC link capacitor and a withstand voltage of each element in the converter and the inverter, and sets the predetermined threshold as the overvoltage alarm level when the DC voltage value of the DC link capacitor at the time when the inverter stops the conversion operation is smaller than the predetermined threshold.

2. The motor drive device according to claim 1, wherein settings of the first parameter, the second parameter, the third parameter and the fourth parameter are modifiable by an external instruction.

* * * * *